US011931302B2

(12) United States Patent
Campbell et al.

(10) Patent No.: US 11,931,302 B2
(45) Date of Patent: Mar. 19, 2024

(54) MOBILITY AID DEVICE AND METHOD OF MANUFACTURING

(71) Applicant: CENTAUR ROBOTICS LIMITED, London (GB)

(72) Inventors: Paul Campbell, London (GB); John Reed, London (GB); David Rajan, London (GB)

( * ) Notice: Subject to any disclaimer, the term of this patent is extended or adjusted under 35 U.S.C. 154(b) by 461 days.

(21) Appl. No.: 17/259,850

(22) PCT Filed: Jul. 12, 2019

(86) PCT No.: PCT/IB2019/055951
§ 371 (c)(1),
(2) Date: Jan. 12, 2021

(87) PCT Pub. No.: WO2020/012425
PCT Pub. Date: Jan. 16, 2020

(65) Prior Publication Data
US 2022/0133558 A1    May 5, 2022

(30) Foreign Application Priority Data

Jul. 13, 2018 (GB) ..................... 1811510

(51) Int. Cl.
*A61G 5/04* (2013.01)
*A61G 5/10* (2006.01)
*B62K 11/00* (2006.01)

(52) U.S. Cl.
CPC ............. *A61G 5/04* (2013.01); *A61G 5/1059* (2013.01); *B62K 11/007* (2016.11);
(Continued)

(58) Field of Classification Search
CPC .... A61G 5/04; A61G 5/1059; A61G 2203/14; A61G 2203/18; A61G 2203/42; B62K 11/007
See application file for complete search history.

(56) References Cited

U.S. PATENT DOCUMENTS

| 5,971,091 A | 10/1999 | Kamen et al. |
| 9,168,191 B1 | 10/2015 | Langley |
| 2002/0023787 A1* | 2/2002 | Kamen .................... B62K 1/00 180/7.1 |

(Continued)

FOREIGN PATENT DOCUMENTS

| CN | 201580485 U | 9/2010 |
| CN | 103676943 A | 3/2014 |

(Continued)

OTHER PUBLICATIONS

Combined Search and Examination Report issued in GB Application No. GB1811510.5 dated Jan. 14, 2019, 9 pages.

(Continued)

*Primary Examiner* — Tony H Winner
(74) *Attorney, Agent, or Firm* — RC Trademark Company

(57) ABSTRACT

Optionally, a plurality of spacers 228 is arranged between the planar surface 120 of the interfacing arrangement 114 (or the top horizontal arm) and the seat arrangement 102, for permanently raising the seat arrangement 102 with respect to the interfacing arrangement 114. The spacers 228 can be implemented as rectangular or cylindrical solid blocks that can be fabricated from plastics materials, metals, metal alloys, polymers, ceramics, wood, composites and so forth. The spacers 228 can be fixed between the seat arrangement 102 and the top planar surface 120 of the top horizontal arm of the interfacing arrangement 114 such that height of the seat arrangement 102 relative to the footrest arrangement 116 is raised. For example, a plurality of metallic spacers is fixed between the seat arrangement 102 and the interface arrangement by a technician such as by welding the metallic spacers between the seat arrangement 102 and the interface arrangement. Such metallic spacers enable a height of the seat arrangement 102 to be customized with respect to the footrest arrangement 116, such as, when the height is (Continued)

required to be permanently adjusted for specifications (such as height) of the user.

6 Claims, 3 Drawing Sheets

(52) U.S. Cl.
 CPC ...... *A61G 2203/14* (2013.01); *A61G 2203/18* (2013.01); *A61G 2203/42* (2013.01)

(56) References Cited

U.S. PATENT DOCUMENTS

| | | | | |
|---|---|---|---|---|
| 2004/0075237 | A1* | 4/2004 | Beck | A61G 5/1059 |
| | | | | 280/250.1 |
| 2009/0115149 | A1* | 5/2009 | Wallis | B60N 2/544 |
| | | | | 280/6.159 |
| 2010/0152987 | A1 | 6/2010 | Gorai | |
| 2016/0158078 | A1* | 6/2016 | Kim | A61G 5/041 |
| | | | | 180/6.5 |
| 2018/0335773 | A1* | 11/2018 | Xie | G10L 15/22 |
| 2018/0344549 | A1* | 12/2018 | Torgersson | A61G 5/1043 |
| 2020/0085654 | A1* | 3/2020 | Moore | A61G 5/06 |
| 2020/0246207 | A1* | 8/2020 | Williams | A61G 5/1051 |
| 2022/0062075 | A1* | 3/2022 | Bleakney | A61G 5/041 |

FOREIGN PATENT DOCUMENTS

| | | |
|---|---|---|
| CN | 204379581 U | 6/2015 |
| DE | 102007061708 A1 | 6/2009 |
| EP | 2017172 A1 | 1/2009 |
| JP | H05-035460 U | 5/1993 |
| JP | 2007501049 A | 1/2007 |
| JP | 2008086690 A | 4/2008 |
| JP | 2009100954 A | 5/2009 |
| JP | 2009523276 A | 6/2009 |
| JP | 2016500505 A | 1/2016 |
| KR | 20110092399 A | 8/2011 |
| WO | 2014148707 A1 | 9/2014 |

OTHER PUBLICATIONS

Notification of Transmittal of the International Search Report and Written Opinion of the International Searching Authority mailed in PCT Application No. PCT/IB2019/055951 dated Nov. 22, 2019, 13 pages.

Notification Concerning Transmittal of the International Preliminary Report on Patentability mailed in PCT Application No. PCT/IB2019/055951 dated Jan. 28, 2021, 9 pages.

Notice of Reasons for Refusal issued on Japanese Patent Application 2021-524485 dated Jun. 26, 2023, 9 Pages.

* cited by examiner

MOBILITY AID DEVICE AND METHOD OF MANUFACTURING

TECHNICAL FIELD

The present disclosure relates to mobility aid devices. More specifically, the present disclosure relates to motorized wheelchairs using artificial intelligence. Furthermore, the present disclosure relates to methods of (for) manufacturing mobility aid devices. Moreover, the present disclosure also relates to computer program products comprising a non-transitory computer-readable storage medium having computer-readable instructions stored thereon, the computer-readable instructions being executable by a computerized device comprising processing hardware to execute aforesaid methods of (for) manufacturing mobility aid devices.

BACKGROUND

In general, people with any degree of mobility impairment may welcome, or even require, a mobility aid device. A wheelchair, being a typical example of such a mobility aid device, enables a given person to use his or her arms as a main drive for achieving mobility. Moreover, a wheelchair also enables the given person to be moved with more convenience, conform and ease.

However, the conventional wheelchair has technical drawbacks. A conventional wheelchair is equipped with a pair of large wheels placed on lateral sides of the conventional wheelchair, and a pair of smaller wheels placed in a front region of the conventional wheelchair, wherein such a configuration of wheels imparts stability to the conventional wheelchair when in use. Such an arrangement, although stable, is generally known to be unsuitable for many day-to-day social situations, for example, when manoeuvring through a narrow doorway, accessing public transportation or even simple day-to-day actions such as fitting in at a peripheral edge of a dining table.

Devices that do not possess an in-built motor may potentially not be suitable for use by people with a lower degree of physical ability, for example diminished muscle strength, for example people in older age groups with less strength in their arms.

Conversely, it has been widely appreciated that a given person's requirement for mobility may result in a mental stress for the given person, being aware of a need for support and assistance from other people, for example carers. Of course, it will be appreciated that a drawback of a conventional wheelchair is that it is not suitable for a person with disability in hands or arms, when attempting to move about without the aid of a second person, for example a carer.

Other issues faced by a user (occupant) of a conventional wheelchair may be an inability to reach certain articles placed on conventional shelves, tables and counters, especially when these are placed higher than, approximately, a waste height of a typical person. Such inability to reach certain articles increases a dependability of the user on other people. Facing such practical problems as aforementioned, there is a risk that the user may develop a low self-esteem and a reduced zeal for life.

More modern wheelchairs or mobility aid devices than aforementioned examples may have features that try to overcome such technical drawbacks. For example, such more modern devices may contain in-built motors to improve or aid mobility; they may contain four or more wheels for improving their stability; their frame may be fabricated from sturdy but lighter metals (such as aluminium alloys); or even such devices may have features to increase comfortability in their seating cushion, neck-rest, back-rest, foot-rest, pivotable seating and so forth. It will be appreciated that incorporating such features in the devices typically result in the devices having an increased weight, an increased size and an increased complexity. However, an increased bulkiness of the devices can be detrimental to overall achievable mobility. For this reason, even modern mobility aid devices are simply not suitable for many day-to-day practical situations.

Therefore, in light of the foregoing discussion, there exists a need to overcome the aforementioned drawbacks associated with mobility aid devices, ultimately resulting in a better quality of life and a higher degree of freedom for people who may welcome or require mobility aid.

SUMMARY

The present disclosure seeks to provide an improved mobility aid device, such as a device akin to a wheelchair, for providing mobility assistance to a user (occupant). The present disclosure also seeks to provide an improved method of (for) manufacturing a mobility aid device.

The present disclosure also seeks to provide a software product recording on machine-readable data storage media, characterised in that the software product is executable upon computing hardware for implementing the aforementioned method.

According to a first aspect, there is provided a mobility aid device including a seat arrangement upon which a user sits when the mobility aid device is in operation, a main unit that supports the seat arrangement, and a wheel arrangement that supports the main unit on a floor surface, wherein the mobility aid device is driven in operation from a motor arrangement included in the main unit and/or the wheel arrangement, wherein the mobility aid device is propelled forwards or backwards, and turned by the motor arrangement, characterised in that the wheel arrangement includes two wheels mounted at lateral sides of the main unit, wherein the two wheels are mutually independently driven in operation by the motor arrangement, the mobility aid device is self-balancing using the two wheels by employing a control module that controls an electrical signal that is applied to the motor arrangement, and the wheels are contained within an area that is less than 120% of a seating area of the seat arrangement.

The mobility aid device is of advantage in that the mobility aid device comprises two wheels that provide a compact form factor to the mobility aid device, thus allowing easy manoeuvring thereof in confined spaces; the mobility aid device is self-balancing on the two wheels thereby, enabling the user to safely, comfortably and efficiently operate (such as drive) the mobility aid device.

According to a second aspect, there is provided a method of (for) manufacturing a mobility aid device including a seat arrangement upon which a user sits when the mobility aid device is in operation, a main unit that supports the seat arrangement, and a wheel arrangement that supports the main unit on a floor surface, wherein the mobility aid device is driven in operation from a motor arrangement included in the main unit and/or the wheel arrangement, wherein the mobility aid device is propelled forwards or backwards, and turned by the motor arrangement, characterised in that the method includes:

arranging for the wheel arrangement to include two wheels mounted at lateral sides of the main unit, wherein the two wheels are mutually independently drivable in operation by the motor arrangement;

arranging for the mobility aid device to be self-balancing using the two wheels by employing a control module that controls an electrical signal that is applied to the motor arrangement; and arranging for the wheels to be contained within an area that is less than 120% of a seating area of the seat arrangement.

According to a third aspect, there is provided computer program products comprising a non-transitory computer-readable storage medium having computer-readable instructions stored thereon, the computer-readable instructions being executable by a computerized device comprising processing hardware to execute aforesaid methods of (for) manufacturing a mobility aid device of the first aspect.

It will be appreciated that features of the present disclosure are susceptible to being combined in various combinations without departing from the scope of the present disclosure as defined by the appended claims.

BRIEF DESCRIPTION OF THE DRAWINGS

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

In overview, embodiments of the present disclosure are concerned with mobility aid devices having a plurality of wheels, for example two wheels, wherein the mobility aid devices are capable of self-balancing. Furthermore, embodiments of the present disclosure are concerned with methods of manufacturing the aforementioned mobility aid devices. Moreover, embodiments of the present disclosure are concerned with computer program products comprising a non-transitory computer-readable storage medium having computer-readable instructions stored thereon, the computer-readable instructions being executable by a computerized device comprising processing hardware to execute aforesaid methods of (for) manufacturing a mobility aid device.

The present disclosure provides the mobility aid device having two wheels which are mutually independently drivable in operation by the motor arrangement, thereby, enabling convenient manoeuvring of the mobility aid device in confined spaces. Furthermore, the mobility aid device comprises an interfacing arrangement that facilitates movement, such as raising or lowering, of the seat arrangement along with the footrest arrangement, thereby permitting the user to easily access higher or lower places when using the mobility aid device. Moreover, for example, the mobility aid device contains wheels to be within an area that is less than 120% of a seating area of the seat arrangement, thus, allowing the mobility aid device to have a compact form factor. Thus, the mobility aid device is compact and is associated with simple and user-friendly operation, thereby, allowing the user of the mobility aid device to be provided with enhanced quality of life.

Figure 1:
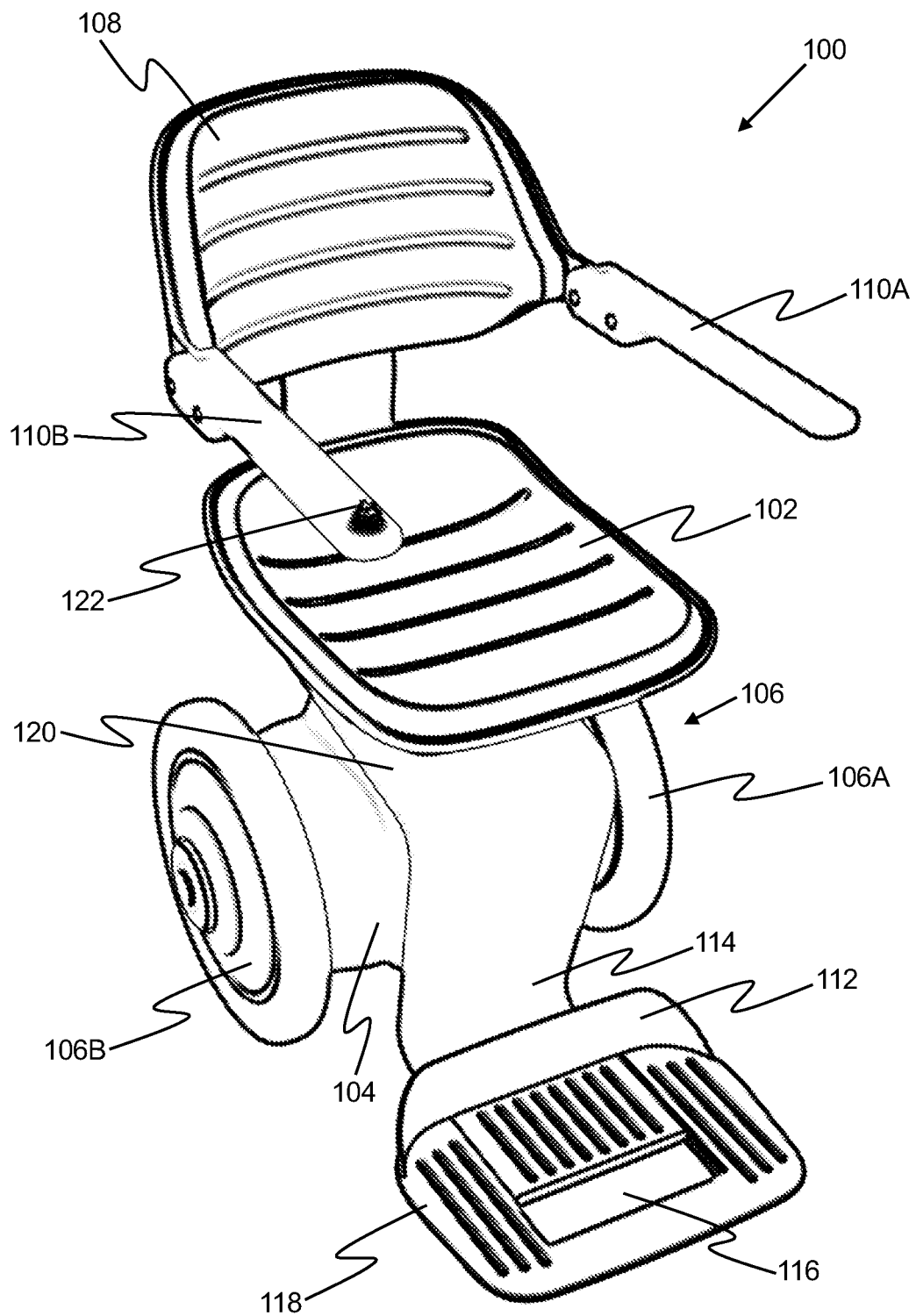
FIG. 1 is a perspective view of a mobility aid device, in accordance with an embodiment of the present disclosure.

Referring to FIG. 1, there is shown a perspective view of a mobility aid device 100, in accordance with an embodiment of the present disclosure. The mobility aid device 100 has an appearance akin to a wheelchair. Furthermore, the mobility aid device 100 is susceptible to being utilized by people who have a need for more personal mobility, but not limited thereto, people suffering from paraplegia, people with dysfunctional arms or feet (such as, due to muscular dystrophy), people suffering from motor or sensory impairment (for example, people suffering from Amyotrophic Lateral Sclerosis) and so forth. The mobility aid device 100 includes a seat arrangement 102 upon which a user sits when the mobility aid device 100 is in operation. The seat arrangement 102 allows accommodation of the user upon the mobility aid device 100 and further allows a weight of the user to be supported thereon. It will be appreciated that the user can attain a relaxed position when being seated on the seat arrangement 102 and can operate (such as drive) the mobility aid device 100 while exerting only a small degree of physical effort (for example, merely finger movement or uttering oral instructions), for example minimal physical effort.

The mobility aid device 100 is further provided with a back-support 108 arrangement with two arm rests 110A-B that provide the given user with back support and arm support when the mobility device aid 100 is in use. The back-support 108 arrangement is a substantially vertical component coupled to an end of the seat arrangement 102; by "substantially vertical" is meant within an angle of +/−20 degrees relative to true vertical, more optionally within an angle of +/−10 degrees relative to true vertical. Furthermore, the back-support 108 can comprise a cushion attached to the vertical component. The back-support 108 arrangement allows the user to rest his or her back while the user is sitting on the seat arrangement 102. The cushion attached to the back-support 108 provides enhanced comfort to the user. Optionally, the cushion cover of the cushion attached to the back-support 108 can be made of material such as Rexine (Rexine is the registered trademark in the United Kingdom by Rexine Ltd.) which can be cleaned with ease for the maintenance of hygiene and can also be visually aesthetically pleasing. Furthermore, the back-support 108 can also have a neck and head support arrangement which can be detachably attached to the vertical component of the back-support 108 arrangement (or can be formed as an integral part of the vertical component), wherein the neck and head support arrangement allows the user to rest his or her head and neck thereon. The neck and head support arrangement can be fabricated to include a cushion (or foam, memory-foam, fibre or so forth) padding that allows the user to maintain his or her head and neck in a relaxed posture. The neck and head support can be made to be raised, lowered, or pivotable as required by the user up to a certain extent i.e. to a certain angular and/or positional degree so the user can adjust his or her head and neck support arrangement. Furthermore, as the neck and head support arrangement is detachably coupled to the vertical component, the neck and head support arrangement can be detached from the vertical component of the back-rest arrangement, such as, for cleaning, repairing or servicing thereof.

The mobility aid device 100 includes a main unit 104 that supports the seat arrangement 102. The main unit 104 can be implemented as a base upon which the seat arrangement 102 is positioned. It will be appreciated that such a positioning of the seat arrangement 102 over the main unit 104 enables the seat arrangement 102 to be disposed at a predetermined height over a floor surface, thereby, allowing the user to comfortably sit on the seat arrangement 102; by "predetermined height" is meant, for example, in a range of 30 cm to 70 cm over (i.e. above) the floor surface, more optionally substantially 45 cm over the floor surface. Furthermore, the mobility aid device 100 includes a wheel arrangement 106 that supports the main unit 104 on the floor surface. The wheel arrangement 106 comprises wheels 106A-B coupled to the main unit 104, wherein the wheels 106A-B allow movement of the main unit 104 (and consequently, the mobility aid device 100) on the floor surface. The wheels 106A-B are contained within an area that is less than 130% of a seating area of the seat arrangement 102, more optionally less than 120% of a seating area of the seat arrangement 102, and yet more optionally less than 100% of a seating area of the seat arrangement 102. For example, the seating area corresponds to an area of 0.25 m². In such an example, the wheels 106A-B are contained within an area that is less than 0.3 m². The two wheels 106A-B are such incorporated that the overall effective area of the mobility aid device 100 does not occupy a large space, thereby, enabling trouble-free manoeuvring of the mobility aid device 100.

The mobility aid device 100 is driven in operation from a motor arrangement (shown in FIG. 2) included in the main unit 104 and/or the wheel arrangement 106, wherein the mobility aid device 100 is propelled forwards or backwards and turned by the motor arrangement. The motor arrangement can comprise at least one motor that is operatively coupled to the wheels 106A-B of the wheel arrangement 106. In operation, the motor arrangement provides a torque to rotate the wheels 106A-B of the wheel arrangement 106, such that the rotation of the wheels 106A-B allows movement of the mobility aid device 100. Furthermore, the motor arrangement can be incorporated within the main unit 104, for example, the main unit 104 can be a housing that incorporates the motor arrangement therein. Alternatively, the motor arrangement can be incorporated with the wheel arrangement 106. In an example implementation, the motor arrangement can comprise in-wheel motors (or wheel-hub motors) that are implemented with each wheel of the wheel arrangement 106, wherein such in-wheel motors are arranged to be mutually independently operated to drive their corresponding wheels. It will be appreciated that implementing the motor arrangement to comprise in-wheel motors enables to reduce a requirement of space within the main unit 104 for incorporating the motor arrangement therein. Thus, one or more other components of the mobility aid device 100 can be accommodated within the main unit 104 and/or the main unit 104 can be made to have a more compact form-factor.

As shown, the wheel arrangement 106 includes two wheels 106A-B mounted at lateral sides of the main unit 104, wherein the two wheels 106A-B are mutually independently driven in operation by the motor arrangement. Optionally, the in-wheel motors housed in each of the two wheels 106A-B provide torque to the wheels 106A-B which facilitates independent rotation of the wheels 106A-B. As the motor arrangement is able to provide mutually independent rotation to the wheels 106A-B, one wheel can move in either direction (namely, is potentially bi-directional in movement) irrespective of the direction of the other wheel. For example, if the user wants to move forward, both the wheels 106A-B will be driven by the motor arrangement in the forward direction. Furthermore, if the user wants to drive backwards, both the wheels 106A-B will be driven by the motor arrangement in the backwards direction, wherein the wheels 106A-B driven by the motor arrangement will make the mobility aid device 100 to move backwards. Additionally, if a person using the wheelchair wants to turn around to face a different direction, such as a left or right direction, one of the two wheels 106A-B will rotate independently while the other wheel will remain stationary; alternatively, the two wheels 106A-B will rotate independently, in mutually opposite directions of rotation. For example, if a person wants to turn towards the left direction, left wheel 106A of the mobility aid device 100 will remain in a stationary position and the right wheel will be made to rotate. In such an example, the mobility aid device 100 pivotally rotates about the left wheel 106A to turn towards the left direction. Similarly, for turning towards the right direction, the right wheel 106A of the mobility aid device 100 will be maintained in a stationary position and the left wheel 106A will be made to rotate. Furthermore, if the user wants to turn at an angle of 180° to face an opposite direction in a confined space, each of the two wheels 106A-B will rotate in mutually opposite directions. Such a rotation of the wheels 106A-B of the wheel arrangement 106 in opposite directions allows the mobility aid device 100 to change its orientation relative to a vertical axis passing through a centre of the mobility aid device 100. It will be appreciated that incorporating such an operation of the mobility aid device 100 via the independent rotation of the wheels 106A-B enables the mobility aid device 100 to move forward, backward or turn sideways. Furthermore, such a movement of the mobility aid device 100 enables convenient manoeuvring of the mobility aid device 100 in confined spaces or on uneven terrains, thereby, allowing to overcome problems associated with movement of conventional wheelchairs.

Furthermore, the mobility aid device 100 comprises the two arm rests 110A-B that provide arm support to the user when the mobility aid device 100 is in use. The two arm rests 110A-B are substantially horizontal (for example, within an angle of +/−20 degrees relative to true horizontal, more optionally within an of +/−10 degrees relative to true horizontal) elongate and solid set of members that are connected to each side of the seat arrangement 102 substantially parallel (such as, within a range of ±20°, as aforementioned) to the floor surface. Optionally, the arm rests 110A-B can be implemented as hollow set of members which further can be used as cabinets for storing electronic components for the mobility aid device 100. More optionally, the hollow set of members can be used to store personal belongings (such as keys, jewelry, wallet and so forth), medicines, portable devices (such as mobile phones, earphones and the like).

The arm rests 110A-B are pivotally mounted at their proximate ends to the back-support 108 arrangement and are downwardly pivotable and are lockable in position with their elongate axes substantially parallel to the floor when the mobility aid device 100 is in use. The arm rests 110A-B are attached to the proximate ends of the back-support 108 arrangement via a hinge mechanism arranged at either side (namely, both sides) of the back-support 108 arrangement. The hinge mechanism allows the arm rests 110A-B to be pivoted downwards, such as, within a range of 0° to 60° with respect to the horizontal position of the arm rests 110A-B.

Furthermore, the hinge mechanism can comprise a locking mechanism that allows the arm rests 110A-B to be locked at a specific angle between the horizontal position (0°) and the lowermost position (60°) thereof. Optionally, the arm rests 110A-B are upwardly pivotable, such as, within a range of 0° to 90° with respect to the horizontal position of the arm rests 110A-B. More optionally, the arm rests 110A-B can be pivoted sideways. Such a pivotability of the arm rests 110A-B allows convenient adjustment of a seating position of the user.

Furthermore, the main unit 104 includes a linear actuator arrangement for raising and lowering the seat arrangement 102 relative to the main unit 104. The linear actuator arrangement can be implemented using a piston-cylinder assembly, a linear slide actuator, an electrical actuator, an electromechanical actuator, a magnetic actuator, an electromagnetic actuator and so forth. For example, when the linear actuator arrangement is implemented using the piston-cylinder assembly, the cylinder can be attached to the main unit 104 while the piston accommodated within the cylinder can be attached to the seat arrangement 102. Furthermore, the piston-cylinder arrangement can be incorporated with a hydraulic (or a pneumatic mechanism) such that, when a pressurized liquid is allowed to flow into the cylinder, the piston within the cylinder is pushed, thereby raising the seat arrangement 102 relative to the main unit 104. Moreover, the pressurized liquid can be allowed to flow out of the cylinder to lower the piston and consequently, the seat arrangement 102 attached thereto. Optionally, the linear actuator arrangement comprises a locking mechanism to lock the seat arrangement 102 at a desired height. For example, the seat arrangement 102 can be raised by using the linear actuator arrangement as per the convenience of the user such as for reaching for upper shelves or cupboards. In another example, the seat arrangement 102 can be lowered by using the linear actuator arrangement as per the convenience of the user such as when the user needs to use a table with a height lower than a default height of the seat arrangement 102. In such an example, the locking mechanism of the linear actuator arrangement allows the seat arrangement 102 to be locked at a desired height such as, after lowering the seat arrangement 102 to the height of the table.

Optionally, the main unit 104 includes a rechargeable battery arrangement for storing electrical power, wherein the rechargeable battery arrangement provides electrical power to the motor arrangement and to the linear actuator arrangement when the mobility aid device 100 is in operation; optionally, the rechargeable battery arrangement is implemented using at least one of: Lithium rechargeable batteries, ultracapacitors, supercapacitors, accumulators and such like. The rechargeable battery arrangement can be incorporated within the main unit 104 and can comprise one or more batteries which can be used to provide electrical power rechargeable motor arrangement housed in the main unit 104 (such as, to the in-house motors housed within the wheel arrangement 106). In such an instance, the electrical power provided by the battery arrangement is converted to torque by the motor arrangement which is used to drive the two wheels 106A-B associated with the wheel arrangement 106. Furthermore, the rechargeable battery arrangement provides power to the linear actuator arrangement which enables the interfacing arrangement 114 to be raised or lowered with respect to the floor surface. The one or more batteries of the battery arrangement can be recharged once the electrical power stored therein is exhausted, such as by connecting a plug attached to the battery arrangement with a power socket.

Optionally, the rechargeable battery arrangement is connected to a resonant inductive charging arrangement for charging the rechargeable battery arrangement with electrical power. The battery recharges utilizing the principle of resonant inductive charging which facilitates quick charging of the battery arrangement. The battery arrangement comprises of a coil which can be inductively coupled to a coil of resonant inductive charging arrangement. The resonant inductive charging arrangement comprises a cable attached with a plug that can be connected to a power socket. In such an example, the electrical power received from the power socket can be utilized by the resonant inductive charging arrangement to inductively (such as wirelessly) charge the rechargeable battery arrangement. In an example, the battery arrangement can be arranged near the bottom of the main unit 104 of the mobility aid device 100. Furthermore, the resonant inductive charging arrangement can be placed on the floor surface. In such an example, the mobility aid device 100 can be positioned over the resonant inductive charging arrangement such that electrical power can be inductively provided by the resonant inductive charging arrangement to the rechargeable battery arrangement. In another example, the battery arrangement can be arranged within the main unit 104, towards a rear end thereof. Furthermore, the resonant inductive charging arrangement can be placed on a wall at a predefined height from the floor surface (such that the height of the resonant inductive charging arrangement corresponds to the height of the rechargeable battery arrangement housed within the main unit 104 relative to the floor surface). In such an example, the mobility aid device 100 can be positioned near the resonant inductive charging arrangement placed on the wall such that electrical power can be inductively provided by the resonant inductive charging arrangement to the rechargeable battery arrangement.

Optionally, a footrest arrangement 116 is coupled to the seat arrangement 102 via an interfacing arrangement 114 arranged between the linear actuator arrangement and the seat arrangement 102, wherein the footrest arrangement 116 is raised and lowered by the linear actuator arrangement together with the seat arrangement 102. The interfacing arrangement 114 is a Z-shaped component (wherein a long arm of the Z-shaped component is substantially vertical, such that the long arm of the Z-shaped component makes an angle within a range of 85 to 95° with the floor surface). Optionally, the interfacing arrangement 114 has a planar surface 120 for engaging onto the seat arrangement 102 (referred to as "top horizontal arm" throughout the present disclosure), wherein the planar surface 120 is substantially parallel to the planar component 112 of the footrest arrangement 116 (referred to as "bottom horizontal arm" throughout the present disclosure). The top horizontal arm of the interfacing arrangement 114 is arranged between the seat arrangement 102 and the linear actuator arrangement. Furthermore, a top planar surface 120 of the top horizontal arm of the interfacing arrangement 114 is connected to the seat arrangement 102 whereas the bottom surface of the top horizontal arm is connected to the linear actuator arrangement. The mobility aid device 100 further comprises the footrest arrangement 116 which is coupled to the bottom horizontal arm of the interfacing arrangement 114. The footrest arrangement 116 allows the user to rest their feet thereon when the mobility aid device 100 is in use. Furthermore, as the footrest arrangement 116 is coupled to the linear actuator arrangement via the interfacing arrangement 114, raising or lowering the interfacing arrangement 114 corresponds to the raising or lowering of the footrest arrangement 116.

Optionally, the footrest arrangement 116 has a planar component 112 for receiving feet of the user, wherein the planar component 112 is maintained parallel to the floor when the mobility aid device 100 aid is in operation. The planar component 112 is the bottom horizontal arm of the interfacing arrangement 114 on which the user can rest their feet when the mobility aid device 100 is in use. The planar component 112 is maintained parallel (or substantially parallel such as angle having a magnitude in a range of 0° to 15°) with respect to the floor surface. Optionally, the planar component 112 is maintained above the floor surface within the range of 1 to 3 centimetres. It will be appreciated that, by allowing the user to maintain his or her feet at such a low height, the user is enabled to maintain his or her centre of gravity at a low position. Furthermore, maintenance of centre of gravity at a low point enables a user to balance his or her body weight with ease.

Optionally, a slidable component 118 is coupled to the planar component 112 of the footrest arrangement 116 such that feet of the user are received on the slidable component 118 when the mobility aid device 100 is in use, wherein the slidable component 118 can be horizontally moved parallel to the floor for adjustment thereof by the user. The slidable component 118 is a horizontal member that has a left area on which the user can place his or her left foot, a right area on which the user can place his or her right foot and a middle area disposed between the left and right areas. The left, right and middle areas of the slidable component 118 are beneficially fabricated as a single entity. The slidable component 118 is arranged such that the middle area is disposed over the planar component 112 of the footrest arrangement 116. The slidable component 118 can be horizontally moved, such as back and forth over the planar component 112, according to the comfort of the user. Furthermore, an upper surface of the slidable component 118 comprises a plurality of ribs. The plurality of ribs associated with the slidable component 118 provides improved traction for the feet of the user.

A mobility aid device includes a seat arrangement upon which a user sits when the mobility device aid is in operation, a main unit that supports the seat arrangement, and a wheel arrangement that supports the main unit on a floor surface. The mobility aid device is driven in operation from a motor arrangement included in at least one of the main units and the wheel arrangement, wherein the mobility device aid is propelled forwards or backwards and turned by the motor arrangement. The wheel arrangement includes two wheels mounted at lateral sides of main unit, wherein the two wheels are mutually independently driven in operation by the motor arrangement. The mobility aid device is self-balancing using the two wheels by employing a control module that controls an electrical signal applied to the motor arrangement.

Optionally, the mobility aid device 100 is constructed in a modular manner comprising a plurality of modules that are assembled together to provide the mobility aid device 100 and are disassembled when transporting the mobility aid device 100. The plurality of modules consists of the seat arrangement 102, the back-support 108 arrangement, the main unit 104, the wheel arrangement 106, the interfacing arrangement 114, the footrest arrangement 116 and so forth. Such a plurality of modules can be disassembled such as for convenient transportation, repair, cleaning, storage, replacement (for example, upgradation of a specific module of the plurality of modules) and so forth. Optionally, each module may be replaced separately by an alternative module with different features, such as different dimensions. Such modular upgrading is of advantage in avoiding waste and repurposing modules of the mobility aid device 100.

Optionally, the mobility aid device 100 includes a control arrangement for controlling operation of the mobility aid device 100, wherein the control arrangement controls electrical power applied to the motor arrangement and to the linear actuator arrangement, and wherein the control arrangement is user-controlled by using at least one of: a joystick control, a voice control, a trackball control, an eye-movement control, a button control, a video interface control. In operation, the mobility aid device 100 requires to be driven when the user sits on it. In such an example, the movement of the mobility aid device 100 needs to be controlled according to the user's requirement such as forward movement, backward movement and turning. The control arrangement can be implemented to control such a movement of the mobility aid device 100. The control arrangement can be implemented within the main unit 104, the arm rests 110A-B and so forth. The control arrangement can be operatively coupled to each of the motor arrangement and the linear actuator arrangement, wherein the control arrangement is operable to control the electrical power applied thereto. The electrical power provided to the motor arrangement and the linear actuator arrangement can be controlled by the user via the control arrangement, by using at least one of: a joystick control, a voice control, a trackball control, an eye-movement control, a button control, a video interface control and so forth. In an example, a joystick 122 is operatively coupled to the control arrangement, and the joystick 122 is arranged with either of the two arm rests 110A-B of the seat arrangement 102. In such an example, the user can move or rotate the joystick 122 in any direction, to move the mobility aid device 100 in a corresponding direction. In another example, the control arrangement can be controlled with use of a movement of body weight of the user, such as by leaning in a direction based on the required direction of movement of the mobility aid device 100. In one example, the user is provided with a graphical user interface on a screen of a portable communication device, such as via a software application on a smartphone of the user. In such an example, the graphical user interface comprises a plurality of graphical elements, such as buttons, that allow the user to move the mobility aid device 100 in a required direction, raise the seat arrangement 102 (via the linear actuator arrangement), lower the seat arrangement 102 and so forth.

Optionally, the mobility aid device 100 includes a wireless interface that communicates in operation between the control arrangement and a remote-control unit, such that a third party is able to control wirelessly operation of the mobility aid device 100 from the remote-control unit. The wireless interface communicates between the remote-control unit and the control arrangement via a short-range communication network such as Bluetooth®, BLE® (Bluetooth Low Energy), infrared, ZigBee® and so forth. In such an example, the mobility aid device 100 can be controlled by a person who is within a short range of the mobility aid device 100; by "short range" is meant, for example within a range of up to 50 metres, more optionally within a range of 10 metres. Such a feature of the remote-control unit employed in a mobility aid device 100 enables a user who is entirely-dependent on another person for their basic needs to use the mobility aid device 100 without having a need for the other person to push the mobility aid device 100. Optionally, the remote-control unit can be implemented as a virtual remote-control unit via use of a software application in a smartphone of the other person, so they do not have to carry a remote-control unit separately.

The mobility aid device 100 is self-balancing using the two wheels 106A-B by employing a control module that controls an electrical signal that is applied to the motor arrangement. It will be appreciated that, in operation, the mobility aid device 100 having the two wheels 106A-B at the lateral sides of the main unit 104 may be prone to tilting (such as, by rotation) about the wheels 106A-B, such as due to shifting of the body weight of the user on the seat arrangement 102. Furthermore, the mobility aid device 100 is required to have a control over the amount of tilting of the mobility aid device 100 to prevent harm to the user. In such an instance, the control module is implemented within the mobility aid device 100 such as by incorporating the control module within the main unit 104. The control module is operable to determine the amount of tilting of the mobility aid device 100. Optionally, the control module can comprise a tilt sensing mechanism wherein the tilt sensing mechanism comprises at least one of: a gyroscope, an accelerometer, a magnetometer and so forth. Furthermore, the control module sends the electrical signal (such as a control signal) to the battery arrangement to regulate the amount of electrical power supplied to the motor arrangement. Furthermore, in response to the regulation of the electrical power, the motor arrangement is operable to vary the torque provided to the two wheels 106A-B of the wheel arrangement 106, to enable self-balancing of the mobility aid device 100 by correcting for the tilting thereof. In one example, if the mobility aid device 100 tilts forward beyond a predetermined threshold angle (such as more than 10°), the control module determines an off-balance condition of the mobility aid device 100. In such an example, the control module is operable to provide the electrical signal to the battery arrangement to provide additional electrical power to the motor arrangement. The additional electrical power provided to the motor arrangement provides torque to the wheel arrangement 106 so that the wheels 106A-B drive in the forward direction. Similarly, if the mobility aid device 100 tilts backward beyond a predetermined threshold angle (such as more than 10°), the control module determines an off-balance condition of the mobility aid device 100. In such an example, the control module is operable to provide the electrical signal to the battery arrangement to provide additional electrical power to the motor arrangement. The additional electrical power provided to the motor arrangement provides torque to the wheel arrangement 106 so that the wheels 106A-B drive in the backward direction.

Furthermore, the control module is operable to determine an absence of the off-balance condition, wherein the absence of the off-balance condition corresponds to satisfactory self-balancing of the mobility aid device 100. In such a situation, the control module is operable to cease providing the additional electrical signal when the mobility aid commence is self-balanced and subsequently, commence providing a normal amount of electrical power to the battery arrangement to enable standard operation of the mobility aid device 100. The self-balancing of the mobility aid device 100 via the control module enables the user to conveniently, reliably and efficiently manoeuvre the mobility aid device 100, such as within confined spaces, while ensuring a safety of the user. It will be appreciated that if the control module is unable to determine the off-balance condition (such as forward tilting) of the mobility aid device 100, the footrest arrangement 116 acts as a safety mechanism to prevent forward tilting of the mobility aid device 100 beyond a safety threshold (such as beyond 15°). Optionally, the mobility aid device 100 comprises a safety plate (or a safety shaft) attached to a rear of the main unit 104, wherein the safety plate functions as the footrest arrangement 116 prevent backward tilting of the mobility aid device 100 beyond the safety threshold (such as beyond 15°).

Optionally, the control module is operable to implement an artificial intelligence algorithm thereon; by "artificial intelligence" is meant a software product that is executable on a computing device, wherein the computing device is able itself to modify adaptively its manner of operation in response to input data provide to the computing device, for example from one or more sensors of the mobility aid device 100, from one or more user-adjustable controls of the mobility aid device 100. In such a manner, it is feasible using the control module to teach the mobility aid device 100 to function in a manner that is customized to nuances of the user, for example progressively worse disability of the user as a function of elapsed time. The artificial intelligence can, for example, determine the amount of tilting that is allowed for the mobility aid device 100 to exhibit when in operation. For example, during off-balance conditions, such as when the mobility aid device 100 goes beyond the predetermined threshold angle (such as more than 10°), the artificial intelligence will monitor the off-balance condition and alert the control module. Subsequently, the control module will therefore enable self-balancing of the mobility aid device 100 to regain the balance thereof (as mentioned hereinabove).

In an alternative example, the control module is operable to determine a maximum height ("a critical height") in which a user is allowed to reach. In such an example, the user attempts to reach a particular height in view of the need of the user to adapt his or her position to perform a particular given task. The height may not exceed a critical value of height, which is the value that guarantees the stability of the mobility aid device and therefore the safety of the user (i.e. the critical height). The control module calculates the critical height based on a function of the weight and height of the user (the main variables of the function), the position of the adjustable parts as read by the sensors, and other parameters of the mobility aid device such as the materials of its composition (the parameters of the function). If the user attempts to reach a height that exceeds the critical height, the control module applies a safety mechanism, disallowing a manual control of height, thus preventing the critical height being exceeded. For example, a user may reach a height in a range of 80 cm to 340 cm, if allowed by the control module.

In one example, the artificial intelligence algorithm is operable to monitor one or more parameters associated with use of the mobility aid device 100 by the user, wherein the one or more parameters include, but are not limited to, a time at which the user visits a location, the location visited by the user at specific times, a speed at which the user feels comfortable driving the mobility aid device 100 at a given location, a direction in which the user moves the mobility aid device 100 at different locations, a distance covered by the mobility aid device 100 to reach a given location, an inclination angle of the floor surface at which the mobility aid device 100 is driven at a given location and so forth. The artificial intelligence algorithm will determine patterns associated with the use of the mobility aid device 100 such as in an ongoing basis (or in real-time). Subsequently, the artificial intelligence algorithm enables operation of the mobility aid device 100 based on such determined patterns. For example, in operation, if the user every morning at a specific time visits a park at a certain distance from their home, the artificial intelligence algorithm will record the distance from the home of the user to the park, the time at which the user leaves the home and reaches the park, the inclinations of the floor surface encountered on the way, the speed at which the user prefers to travel and so forth. Furthermore, the artificial intelligence algorithm will determine pattern associated with the user travelling to the park from the home thereof. Subsequently, the artificial intelligence algorithm enables operation of the mobility aid device 100 based on the determined patterns, such as to enable the user to travel the distance from the home to the park at their preferred speed, safely traverse the inclinations of the floor surface encountered on the way and so forth. Optionally, the predetermined patterns of routes can be allowed to be pre-set by the artificial intelligence algorithms, for example as a routine on the smartphone thereof. Consequently, the user can select the routine to conveniently and efficiently use the mobility aid device 100 to travel to the park every morning. For example, the artificial intelligence algorithms can be taught to drive the mobility aid device 100 along a taught route on receiving an oral command from the user of the mobility aid device 100.

Optionally, the artificial intelligence algorithm enables operation of the mobility aid device 100 to predict problems associated with the selected travelling routine of the user. In particular, the artificial intelligence algorithm can determine an amount of traffic occurring in a route selected, from amongst various predetermined patterns of routes, by the user on, for example, a smartphone, more specifically to determine a degree of traffic congestion in different parts of the travelling route selected by the user. The artificial intelligence algorithm accesses a database which stores a volume-to-capacity ratio in respect of different parts of each of a plurality of different predetermined patterns of routes to determine traffic congestion in the respective parts. The database stores the volume-to-capacity ratio of the different parts of each of the different predetermined patterns of routes at a predefined distance, for example, each part is located at a same distance from its proceeding part. Thus, the artificial intelligence algorithm is operable to determine traffic congestion in different parts of the route selected by the user by accessing the database.

The database stores historical data related to the user, wherein the historical data comprises location tracking, journey times, camera images and other sensor data. The artificial intelligence algorithm is operable to access the database to analyse one or more trends associated with the user and further operable to predict problems corresponding to the route selected by the user. The artificial intelligence algorithm is thereby capable of adapting to changing characteristics and traits of the user, for example as the user's health deteriorates as a function of elapsed time.

The present disclosure is of the advantage in that it enables the mobility aid device to assist the user to avoid collisions routing issues and to assist with directions and further helps the user to remember the favorite routes.

The present disclosure is also of the advantage in that it enables the mobility aid device to provide services to the user to opt for different speeds based on the traffic congestion in different parts of the route selected by the user as determined by the artificial intelligence algorithm.

Optionally, the artificial intelligence algorithm can determine an amount of electrical power stored in the battery arrangement; moreover, the artificial intelligence algorithm can monitor a deterioration in energy storage capacity of the battery arrangement as it is subjected to charge-discharge cycles, for example for providing warnings when the battery arrangement needs to be exchanged, repaired or serviced. Subsequently, the artificial intelligence algorithm can correlate the predetermined patterns with the amount of electrical power stored in the battery arrangement. The artificial intelligence algorithm can determine the amount of electrical power of the battery arrangement needed by the user to operate the mobility aid device 100 for a specific time and alert the user about the charging requirements of the mobility aid device 100. For example, the user requires a certain amount of electrical power stored in the battery arrangement (for example, 15% of a total amount of electrical power that can be stored in the battery arrangement) for him or her to visit the park and come back to his or her home. Furthermore, the user is required to travel for a predetermined time of 3 hours for travelling to and from the park from the home thereof. The artificial intelligence algorithm functions to alert the user about the amount of electrical power stored in the battery arrangement if the battery arrangement needs to be electrically recharged. Such an alert can be provided to the user by at least one of: a text message on a smartphone of the user, as a beep sound on the smartphone of the user, a visual indication via the smartphone to the user, and so forth.

Optionally, the artificial intelligence algorithm can determine one or more user preferences associated with a use of mobility aid device 100 by the user over a period of time (such as a week or a month), wherein one or more user preferences include, but are not limited to, the height of the seat arrangement 102 with respect to the floor surface at which the user feels comfortable and the pivoting angle of the arm rests 110A-B as preferred by the user. Furthermore, the artificial intelligence algorithm can alert the control module to calibrate the various arrangements of the mobility aid device 100 as required by the user. For example, the user prefers to maintain the seat arrangement 102 at a height of 0.5 metres with respect to the floor surface and maintain an angle of the arm rests 110A-B at 15°. In such an example, the control module is operable to calibrate, namely to adjust or trim, the mobility aid device 100 prior to commencement of use thereof based on the user preferences determined by the artificial intelligence algorithm.

Optionally, external surfaces of the mobility aid device 100 are beneficially continuous and smooth, such that the surfaces can be wipe-cleaned using a sponge or cloth rag. For example, the exterior surface of the mobility aid device 100 can be fabricated using thermally formed plastics-material panels or 3D printed plastics material panels which provide an improved surface smoothness (such as, to reduce contaminants adhering to the surface and/or to improve aerodynamics associated therewith) and visual appeal of the mobility aid device 100. The mobility aid device 100 has smooth exterior surfaces that are readily cleanable (e.g. using a rag, brush or sponge) for reasons of hygiene (e.g. spills of food or body fluids). The hubs of the two wheels 106A-B of the mobility aid device 100 also have smooth external surfaces which ensure effortless cleaning and maintenance.

Figure 2:
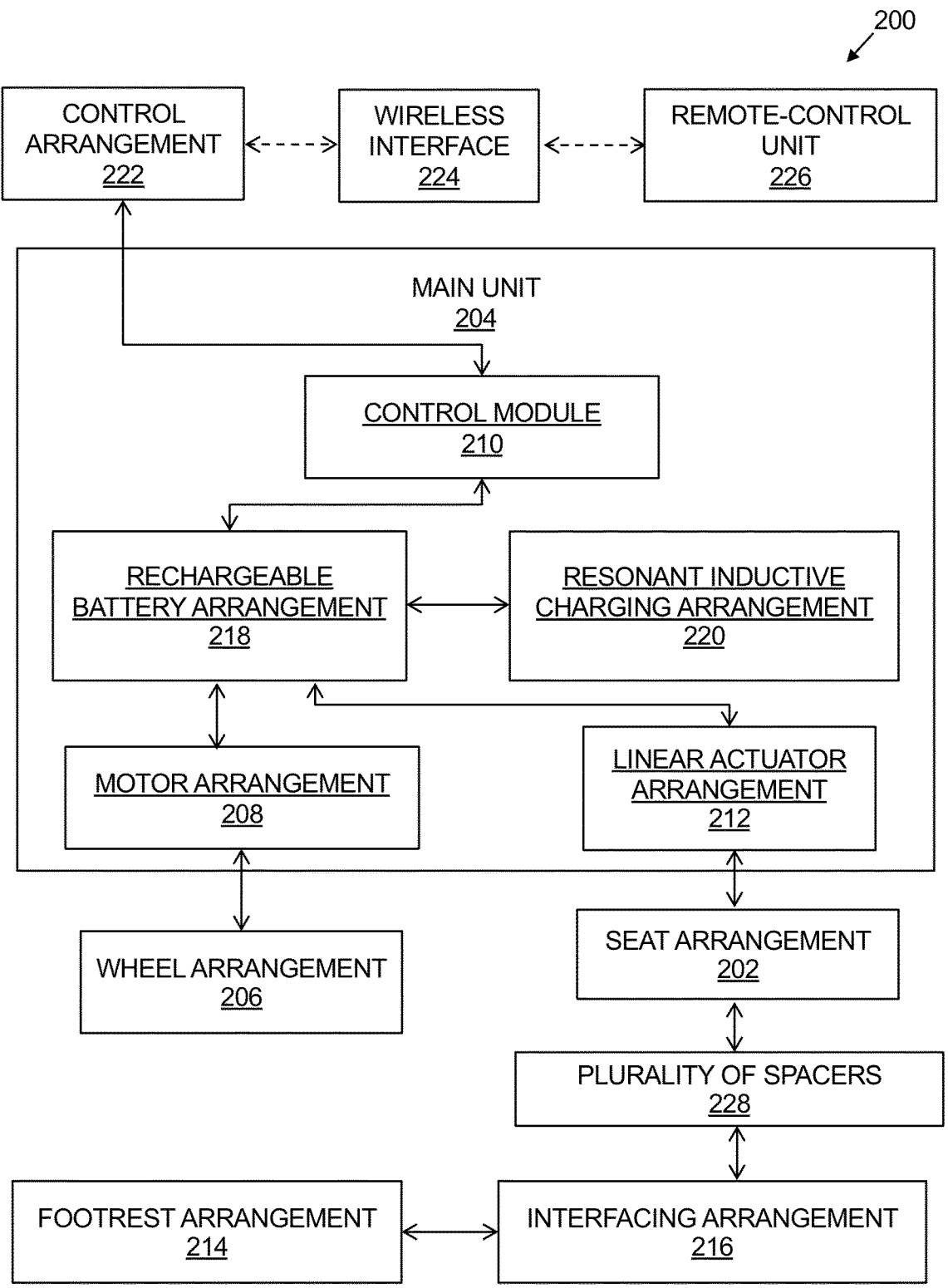
FIG. 2 is a block diagram of a mobility aid device (such as the mobility aid device of FIG. 1), in accordance with an embodiment of the present disclosure.

Referring to FIG. 2, there is shown a block diagram of a mobility aid device 200 (such as the mobility aid device 100 of FIG. 1), in accordance with an embodiment of the present disclosure. As shown, the mobility aid device 200 includes a seat arrangement 202, a main unit 204 and a wheel arrangement 206. The mobility aid device 200 is driven in operation from a motor arrangement 208 included in the main unit 204 and coupled to the wheel arrangement 206. The mobility aid device 200 employs a control module 210 that is included within the main unit 204. The main unit 204 includes a linear actuator arrangement 212. Furthermore, the mobility aid device includes a footrest arrangement 214 that is coupled to the seat arrangement 202 via an interfacing arrangement 216 arranged between the linear actuator arrangement 212 and the seat arrangement 202. Moreover, the main unit 204 includes a rechargeable battery arrangement 218 for storing electrical energy, wherein the rechargeable battery arrangement 218 is connected to a resonant inductive charging arrangement 220 for recharging the rechargeable battery arrangement 218. The mobility aid device 200 includes a control arrangement 222 for controlling operation of the mobility aid device 200. As shown, the control arrangement 222 is coupled to the rechargeable battery arrangement 218 via the control module 210. The mobility aid device 200 includes a wireless interface 224 that communicates in operation between the control arrangement 222 and a remote-control unit 226.

Figure 3:
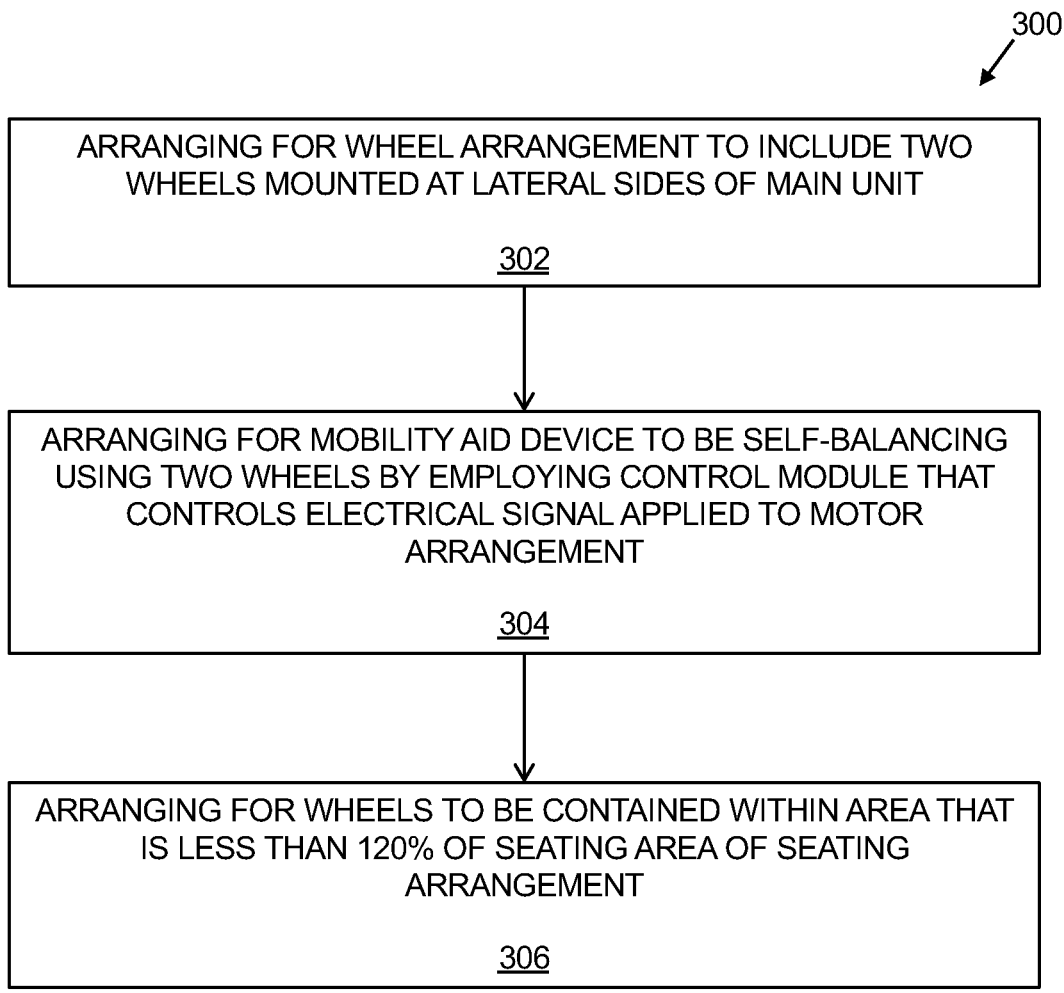
FIG. 3 is an illustration of steps of a method of (for) manufacturing a mobility aid device, in accordance with an embodiment of the present disclosure.

Referring to FIG. 3, there are shown steps of a method 300 of manufacturing a mobility aid device, for example the mobility aid devices 100, 200, in accordance with an embodiment of the present disclosure. The mobility aid device includes a seat arrangement upon which a user sits when the mobility aid device is in operation, a main unit that supports the seat arrangement, and a wheel arrangement that supports the main unit on a floor surface, wherein the mobility aid device is driven in operation from a motor arrangement included in the main unit and/or the wheel arrangement, wherein the mobility aid device is propelled forwards or backwards and turned by the motor arrangement. At a step 302, the wheel arrangement is arranged to include a plurality of wheels, for example two wheels, mounted at lateral sides of the main unit, wherein the two wheels are mutually independently drivable in operation by the motor arrangement. At a step 304, the mobility aid device is arranged to be self-balancing using the two wheels by employing a control module that controls an electrical signal that is applied to the motor arrangement. At a step 306, the wheels are arranged to be contained within an area that is less than 120% of a seating area of the seat arrangement.

The steps 302 to 306 are only illustrative and other alternatives can also be provided where one or more steps are added, one or more steps are removed, or one or more steps are provided in a different sequence without departing from the scope of the claims herein. In an example, the method 300 includes arranging for the mobility aid device to be constructed in a modular manner comprising a plurality of modules that are assembled together to provide the mobility aid device and are disassembled when transporting the mobility aid device. In another example, the method 300 includes arranging for the mobility aid device to include a control arrangement for controlling operation of the mobility aid device, wherein the control arrangement controls electrical power applied to the motor arrangement and to the linear actuator arrangement, and wherein the control arrangement is user-controlled by using at least one of: a joystick control, a voice control, a trackball control, an eye-movement control, a button control, a video interface control. In another example, the method 300 includes arranging for the mobility aid device to include a wireless interface that communicates in operation between the control arrangement and a remote-control unit, such that a third party is able to control wirelessly operation of the mobility aid device from the remote-control unit, for example on behalf of a user of the mobility aid device. In yet another example, the method 300 includes arranging for the control module to implement an artificial intelligence algorithm that enables prediction to be used during operation of the mobility aid device, for example to predict problems associated with a selected travelling routine of the user.

For example, the exterior surface of the mobility aid device can be fabricated using thermally formed plastics-material panels or 3D printed plastics-material panels.

Disclosed is a software product recording on machine-readable data storage media, characterised in that the software product is executable upon computing hardware for implementing a method of manufacturing a mobility aid device, for example the method of FIG. 3 as aforementioned.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A mobility aid device including:
 a seat arrangement upon which a user sits when the mobility aid device is in operation;
 a main unit that supports the seat arrangement, wherein the main unit includes a linear actuator arrangement for raising and lowering the seat arrangement relative to the main unit;
 a footrest arrangement coupled to the seat arrangement via an interfacing arrangement arranged between the linear actuator arrangement and the seat arrangement, wherein the footrest arrangement is raised and lowered by the linear actuator arrangement together with the seat arrangement, wherein the footrest arrangement has a planar component for receiving feet of the user, wherein the planar component is maintained parallel to a floor surface when the mobility aid device is in operation, wherein the interfacing arrangement has a planar surface for engaging onto the seat arrangement, wherein the planar surface is parallel to the planar component of the footrest arrangement, and wherein a plurality of spacers are arranged between the planar surface of the interfacing arrangement and the seat arrangement, for permanently raising the seat arrangement with respect to the interfacing arrangement; and
 a wheel arrangement that supports the main unit on the floor surface, wherein the mobility aid device is driven in operation from a motor arrangement included in at least one of the main unit and the wheel arrangement, wherein the mobility aid device is propelled forwards or backwards, and turned by the motor arrangement, wherein the wheel arrangement includes two wheels mounted at lateral sides of the main unit, wherein the two wheels are mutually independently driven in operation by the motor arrangement, and wherein the mobility aid device is self-balancing using the two wheels by employing a control module that controls an electrical signal that is applied to the motor arrangement.

2. The mobility aid device of claim 1, wherein the mobility aid device is further provided with a back-support arrangement with two arm rests that provide the user with back support and arm support when the mobility device aid is in use.

3. The mobility aid device of claim 1, wherein a slidable component is coupled to the planar component of the footrest arrangement such that the feet of the user are received on the slidable component when the mobility aid device is in use, and wherein the slidable component can be horizontally moved parallel to the floor for adjustment thereof by the user.

4. The mobility aid device of claim 1, wherein the main unit includes a rechargeable battery arrangement for storing electrical energy, and wherein the rechargeable battery arrangement provides electrical power to the motor arrangement and to the linear actuator arrangement when the mobility aid device is in operation.

5. The mobility aid device of claim 1, wherein the mobility aid device includes a control arrangement for controlling operation of the mobility aid device, wherein the control arrangement controls electrical power applied to the motor arrangement and to the linear actuator arrangement, and wherein the control arrangement is user-controllable by using at least one of: a joystick control, a voice control, a trackball control, an eye-movement control, a button control, a video interface control.

6. The mobility aid device of claim 5, wherein the mobility aid device includes a wireless interface that communicates in operation between the control arrangement and a remote-control unit, such that a third party is able to control wirelessly an operation of the mobility aid device from the remote-control unit.

* * * * *